US00RE41078E

(19) United States
(12) Reissued Patent
Schmeichel

(10) Patent Number: US RE41,078 E
(45) Date of Reissued Patent: Jan. 19, 2010

(54) TONNEAU COVER TENSION ADJUSTER APPARATUS

(76) Inventor: Charles M. Schmeichel, P.O. Box 1395, Jamestown, ND (US) 58402-1395

(21) Appl. No.: 09/866,138

(22) Filed: May 25, 2001

Related U.S. Patent Documents

Reissue of:
(64) Patent No.: 5,906,407
Issued: May 25, 1999
Appl. No.: 09/122,874
Filed: Jul. 27, 1998

(51) Int. Cl.
*B60P 7/04* (2006.01)

(52) U.S. Cl. ..... 296/100.15; 296/100.18
(58) Field of Classification Search .....
296/100.15–100.18; 160/372, 374.1, 375
See application file for complete search history.

(56) References Cited

U.S. PATENT DOCUMENTS 1,206,497 A * 11/1916 Banks ..... 160/375
3,949,802 A * 4/1976 Buratovich ..... 160/374.1
4,023,326 A * 5/1977 Azuma et al. ..... 160/372 X
4,144,660 A 3/1979 Lamb
4,565,020 A * 1/1986 Beatriz et al. ..... 160/374.1 X
4,730,866 A 3/1988 Nett
4,838,602 A 6/1989 Nett
4,923,240 A 5/1990 Swanson
5,058,652 A 10/1991 Wheatley et al.
5,076,338 A 12/1991 Schmeichel et al.
5,113,611 A 5/1992 Rosson
5,152,574 A 10/1992 Tucker
5,174,353 A 12/1992 Schmeichel et al.
5,251,951 A 10/1993 Wheatley
5,511,843 A 4/1996 Isler et al.
5,522,635 A 6/1996 Downey
5,526,866 A 6/1996 Flentge
5,540,475 A 7/1996 Kersting et al.
5,595,417 A 1/1997 Thoman et al.
5,636,893 A 6/1997 Wheatley et al.
5,653,491 A 8/1997 Steffens et al.
5,688,017 A 11/1997 Bennett
5,934,735 A * 8/1999 Wheatley ..... 296/100.18 X

* cited by examiner

*Primary Examiner*—Dennis H Pedder
(74) *Attorney, Agent, or Firm*—Moore & Hansen, PLLP

(57) ABSTRACT

A tonneau cover is provided that is attached at its most forward end to an adjustable tensioning rail which spans the front end of a pickup truck box. The tensioning rail is adjustably attached at its outside edges to two side rails which are attached to the inside of a pickup box. The adjustable attachment of the tensioning rail to the side rails is accomplished by the use of a tensioning screw and two attachment blocks. As the tensioning screw is moved forwards and backwards by the use of the adjustment knob, the tensioning rail is moved in a corresponding manner. This adjustment is preformed when the tonneau cover is in the open position, and thus, allows a user to obtain the desired amount if tightness when the tonneau cover is subsequently placed in the closed position.

24 Claims, 5 Drawing Sheets

FIG 5
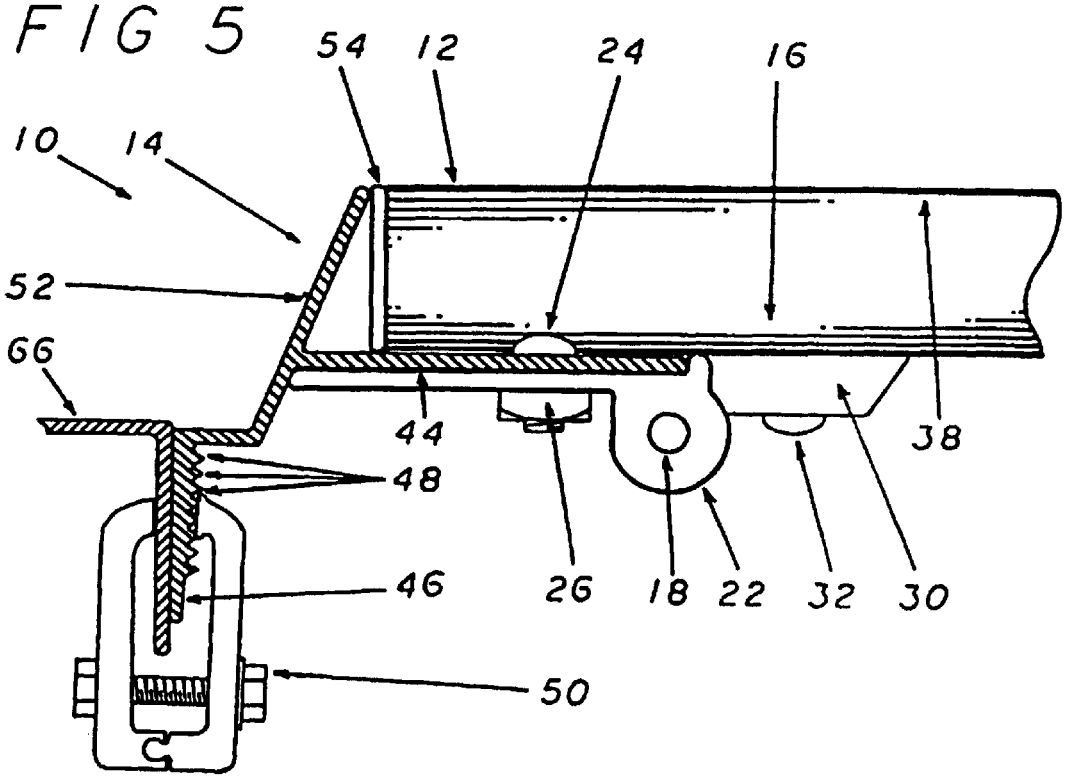
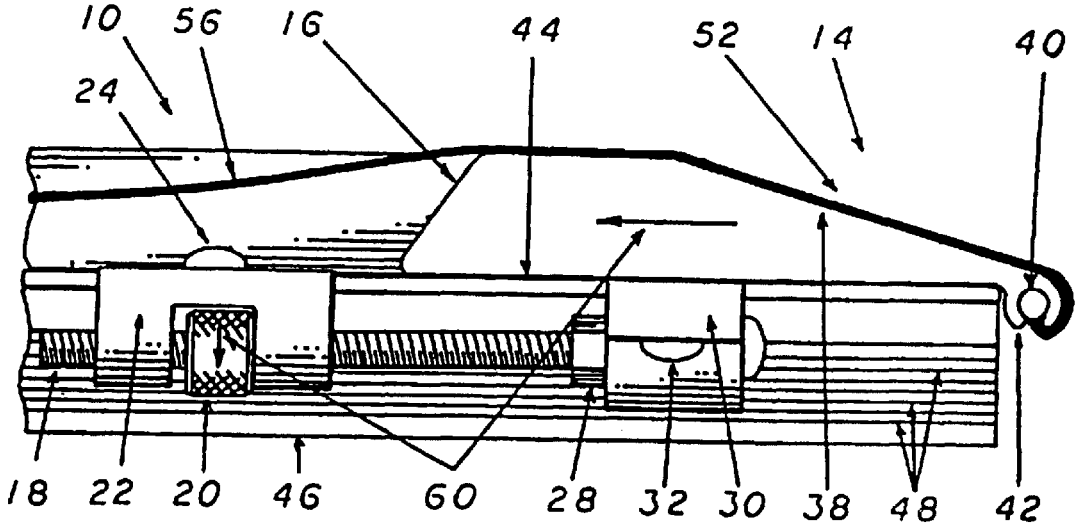
FIG 6

TONNEAU COVER TENSION ADJUSTER APPARATUS

Matter enclosed in heavy brackets [ ] appears in the original patent but forms no part of this reissue specification; matter printed in italics indicates the additions made by reissue.

BACKGROUND OF THE INVENTION

The present invention relates to an improvement in the manner in which a tonneau cover is attached to a pickup truck box. More specifically, a method of attachment which allows for the adjustment of the tonneau cover in order to provide the user with a means by which the tension placed upon the tonneau cover can be varied to provide a tight seal in varying conditions and as the cover ages or stretches.

In the past, tonneau covers have been used to cover box openings of pickup trucks to protect the contents from wind, rain and snow, or simply for cosmetic reasons. The types of tonneau covers and methods of fastening the covers have varied greatly over the years. In recent years, one type of cover that has been commonly used is a tonneau cover that attaches at one end, typically the front end nearest the cab of the vehicle, in a permanent fashion. The sides and tailgate area are fastened to box of the pickup when closed. In the open position, the cover may be rolled forward toward the cab of the pickup and the attached end of the tonneau cover.

The problem with this type of arrangement is that tonneau covers may stretch over time. This can be greatly affected by the weather and use or stress placed upon the tarp. As the tarp sags, it may begin to look aesthetically poor and cause problems such as puddling of water. This can be especially dangerous when the puddles freeze, resulting in chunks or sheets of ice that fly off during travel and create hazards for other drivers on the road. A second problem caused by sagging tonneau covers is wind flap. This occurs during travel of the vehicle when the tonneau cover flaps in the wind causing noise and creating undue wear and greater stretching of the cover.

In order to deal with this problem, tonneau cover makers have developed ways of adjusting the position of the front portion of tonneau cover. Typically, the front portion may be bolted on rail or brace system with clamps and thus, the bolts may be loosened and moved on the rail to adjust the position of the front portion of the cover, in turn affecting the tension of the cover when in the attached position. This type of system requires the use of tools and trial and error to get the correct tension of the tonneau cover. It may also be very difficult to adjust each side accurately and evenly with the other. Due to the difficulty in making these adjustments many tonneau cover owners ignore the problem of improperly adjusting the cover after installation and thus, creating undue stress and wear on the cover as well as posing a potentially dangerous condition for others on the road.

From this discussion it can be seen that it would be desirable to create a means of easily adjusting the tension and position of tonneau covers used on pickups today. It can also be seen that it would be advantageous to make this adjustment as easy as possible to make and to insure that users keep their covers in taught arrangement to prevent the problems listed above and to keep the tonneau cover as aesthetically pleasing as possible.

SUMMARY OF THE INVENTION

It is the primary objective of the present invention to provide a method of tightening tonneau covers that are commonly used to protect the contents of pickup truck boxes from wind, rain and snow.

It is an additional objective of the present invention to provide such a method that allows for the adjustment of the tightening apparatus in order to compensate for varying conditions or wear on the tonneau cover.

It is still a further objective of the present invention to provide a such a method that can be employed in an inexpensive and effective manner.

These objectives are accomplished by the use of a tonneau cover that is attached at its most forward end to an adjustable tensioning rail which spans the front end of a pickup truck box. The attachment of the tonneau cover is accomplished by the use of small diameter rope, rod or the like, that is sewn into a loop along the entire forward edge of the cover. The rope and tonneau cover loop are then slid into a receptor channel located along the front lower edge of the tensioning rail which securely holds the leading edge of the tonneau cover in place. This design allows the amount of tension placed on the tonneau cover to be varied by adjusting the location of the tensioning rail, thereby, allowing the user to obtain the desired degree of tension on the installed tonneau cover, when latched.

The tensioning rail is adjustably attached at its outside edges to two side rails which are attached to the inside of a pickup box by the use of a plurality of C-type clamps bolts or the like. The adjustable attachment of the tensioning rail to the side rails is accomplished by the use a tensioning screw and two attachment blocks. The side rails have fixedly mounted blocks through which one end of the tensioning screws pass. The portion of the block through which the screw passes is interrupted at its center by an open space which houses the screw adjustment knob which is in turn threaded over the tensioning screw. Therefore, as the adjustment knob is rotated, the tensioning screw will travel either forwards or backwards within the attachment block because the lateral travel of the adjustment knob is limited by the two sides of the attachment block.

The attachment of the tensioning rail to the tensioning screw is accomplished by using another fixedly mounted block that extends downward from the lower surface of the tensioning rail, just inside of where the tensioning rail sits on the side rail. The tensioning screw again passes through this block but is fixedly mounted to the block by a stop nut that is threaded down the length of the screw until it contacts the block, where it is tightened to hold the screw in place. Therefore, as the tensioning screw is moved forward and backward, with the cover in the open position by the use of the adjustment knob, the tensioning rail is moved in a corresponding manner which serves to adjust the tension placed upon the tonneau cover when subsequently placed in the closed and latched position.

For a better understanding of the present invention reference should be made to the drawings and the description in which there are illustrated and described preferred embodiments of the present invention.

DESCRIPTION OF THE DRAWINGS

FIG. 5 is a front elevation cut-away view of the present invention detailing the manner in which the side rails are attached to the pickup box and the orientation of its major components in relation to the side rails.

FIG. 6 is a side elevation cut-away view of the present invention showing the tensioning screw when the tonneau cover is in an unlocked state with no tension.

DESCRIPTION OF THE PREFERRED EMBODIMENT

Figure 1:
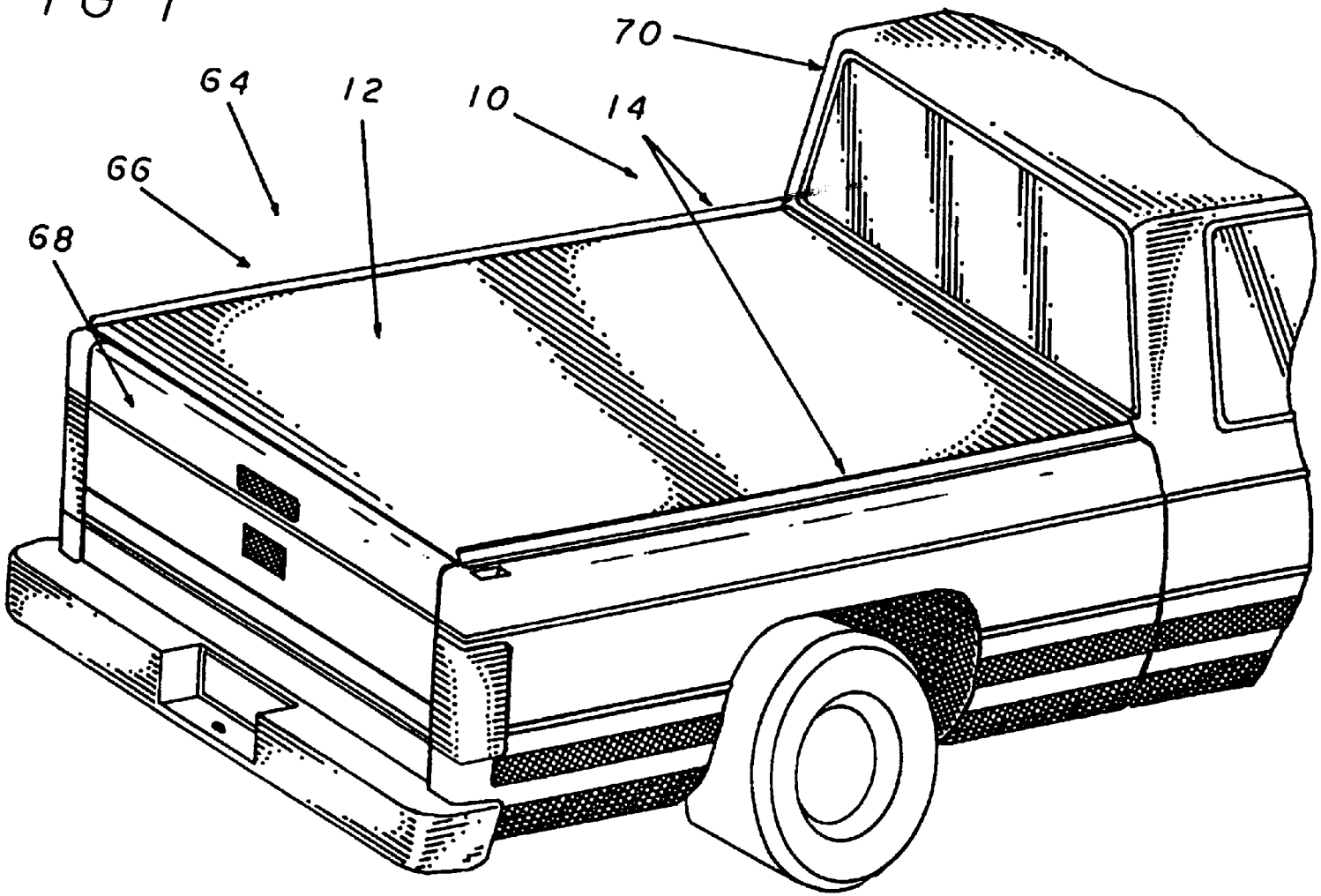
FIG. 1 is a perspective view of the present invention showing the orientation of the invention when it is fitted to the box of a typical pickup box.
Figure 2:
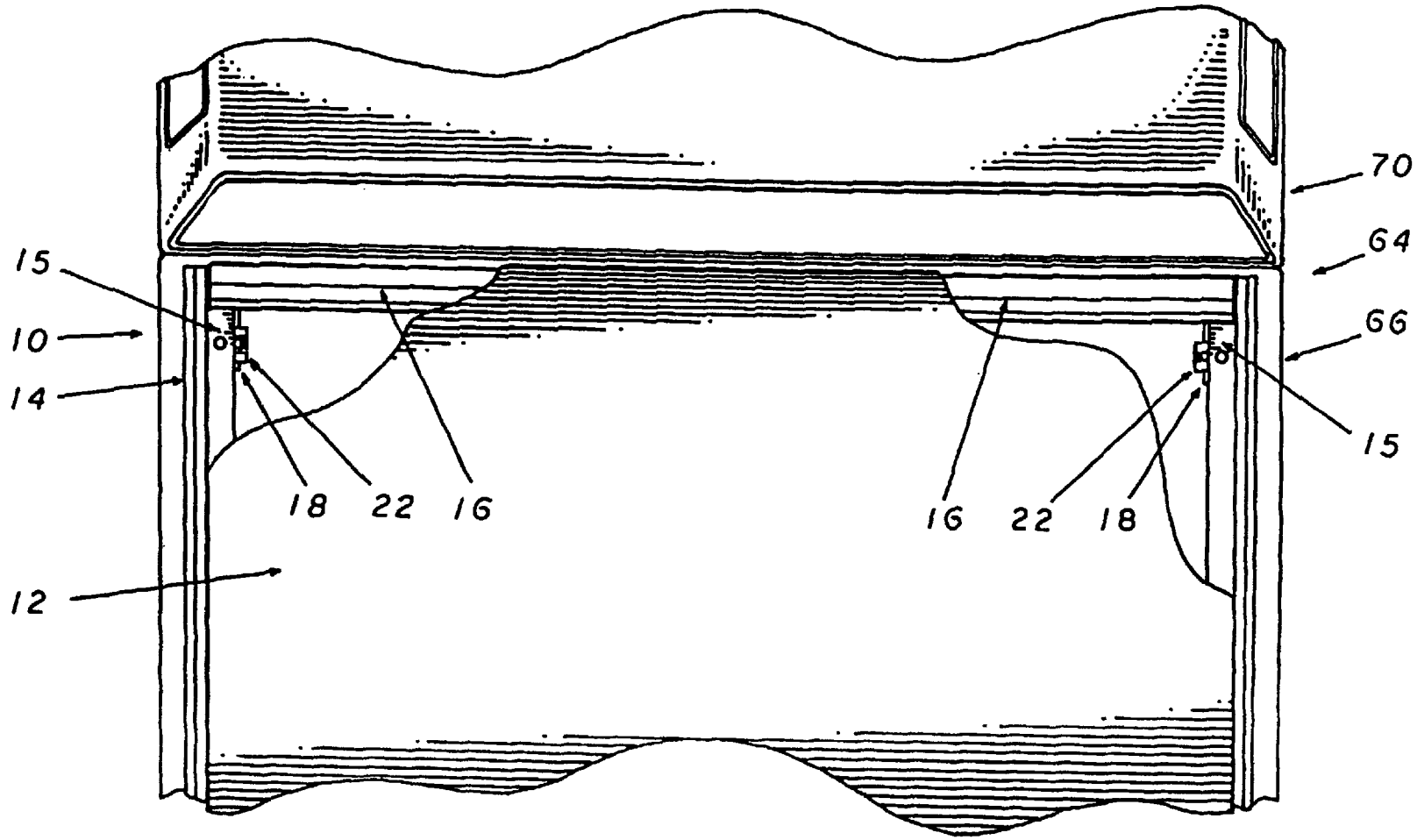
FIG. 2 is a top elevation view cut-away of the present invention showing the orientation of the tonneau cover and the location and method of construction of the tensioning rail apparatus.

Referring now to the drawings, and more specifically to FIGS. 1 and 2, the tonneau cover tension adjuster apparatus 10 is made up of a tonneau cover 12 which fits over and covers the opening of a pickup truck box 66 of a typical pickup truck 64. The tonneau cover 12 extends from just behind the pickup cab 70 back to the tail gate 68 located at the most rearward portion of the truck box 66. This is accomplished by the use of a pair of apparatus side rails 14 which are attached to and run down the entire length of the upper outside edges of the truck box 66. The side rails 14 form the outside frame of the tonneau cover 12 and are the base upon which the cover tensioning rail 16 is attached. The side rails 14 also contain at their forward ends, a pair of graduated measuring scales 15 which give the user a point of reference to ensure that each side of the tensioning rail 16 places the same degree of tension on the tonneau cover 12.

The tensioning rail 16 provides the forward attachment point for the front edge of the tonneau cover 12 and is mounted to the side rails 14 in a manner that allows it to slide forward and rearward to provide the tonneau cover 12 with the motion necessary to either be stretched tightly over the truck box 66 or to be loosened. The attachment and sliding motion of the tensioning rail 16 are both provided by the tensioning screw 18 and the adjustment block 22 located on the most forward underneath end of the side rails 14. Thus, a user can vary the lateral tension placed on the tonneau cover 12 to ensure that it provides a tight seal in all conditions between the interior of the pickup box 66 and the outside elements even in high wind conditions, such as highway driving.

Figure 3:
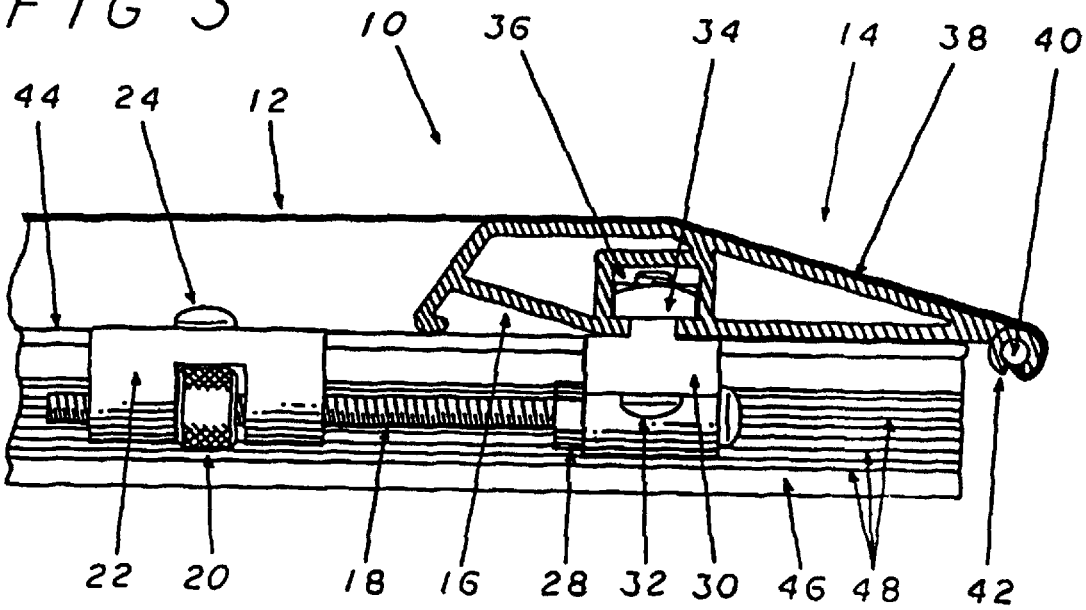
FIG. 3 is a side elevation cut away view of the present invention showing the manner in which the tensioning screw is attached to and controls the positioning of the tensioning rail and the tonneau cover.
Figure 4:
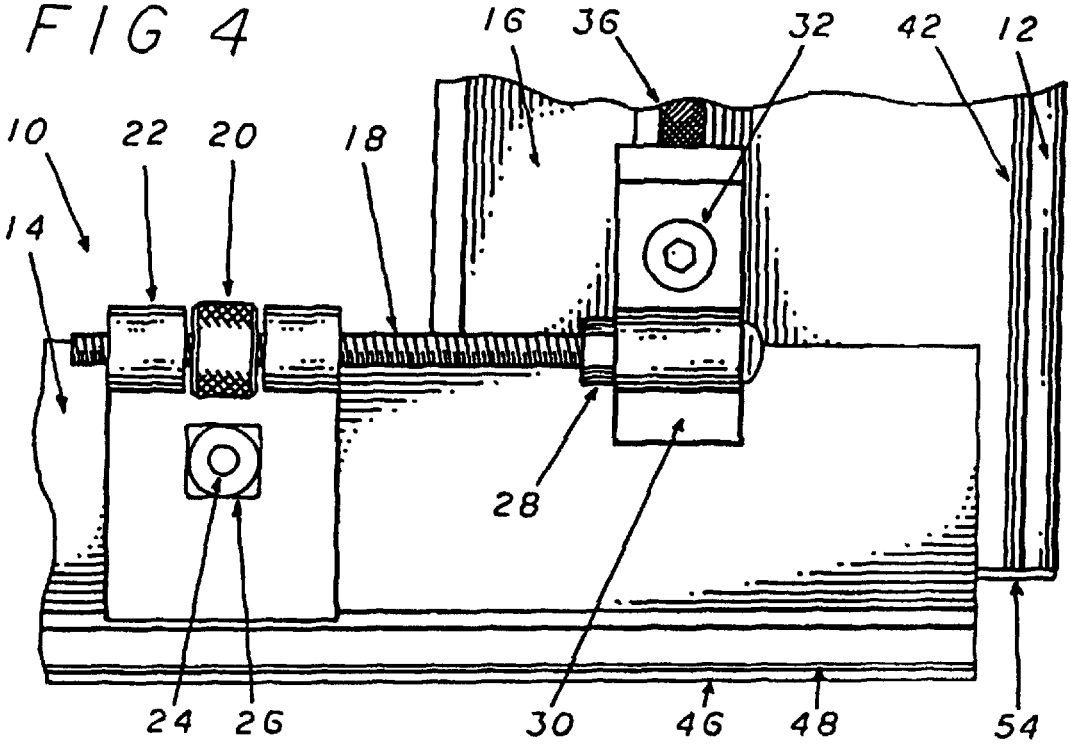
FIG. 4 is a bottom elevation cut-away view of the present invention again showing the manner in which the tensioning screw is attached to and controls the positioning of the tensioning rail and the tonneau cover.

The construction of the mounting and adjustment portion of the tensioning rail 16 of the present invention are detailed in FIGS. 3 and 4. The tensioning rail 16 is perpendicularly mounted between the two side rails 14 at their most forward ends by the use of the adjustment block 22, the tensioning screw 20 and the tensioning rail attachment block 30. The adjustment block 22 is attached to the lower surface of the side rail component mount surface 44 which is the flat laterally extending portion of the side rails 14. This attachment is accomplished by passing the adjustment block attachment bolt 24 downward through both the component mount surface 44 and the adjustment block 22 where it is secured by the attachment nut 26 located on the underneath surface of the adjustment block 22.

The most outward portion of the adjustment block 22 forms two, side by side cylindrical members through the center of which the tensioning screw 18 is passed. In between these two members lies the screw adjustment knob 20. The screw adjustment knob 20 is threaded onto the tensioning screw 18. Its lateral travel is limited by the cylindrical members of the adjustment block 22. Therefore, when the screw adjustment knob 20 is rotated, the tensioning screw 18 moves either forward or rearward, depending upon the direction of rotation of the tensioning screw 18, which controls the orientation of the tensioning rail 16 in relation to the side rails 14.

From the adjustment block 22, the tensioning screw 18 extends forward to where it passes through the tensioning rail attachment block 30. At its most forward end, the tensioning screw's 18 lateral travel is limited by the screw head, which rests against the outside forward edge of the rail block 30. The most forward portion of the tensioning screw 18 is then held in a locked position within the tensioning rail attachment block 30 by the use of the tensioning screw stop nut 28. The tensioning screw lock nut 28 is threaded down the length of the tensioning screw 18 until it comes in contact with the rearward surface of the rail block 30. At this point, it is tightened into place so as to hold the tensioning screw 18 securely within the rail block 30. In another embodiment (not shown) the tensioning screw stop nut 28 may be eliminated by molding the tensioning screw 18 and screw head directly into the rail back 30. Thus, the tensioning screw 18 and the rail block 30 would be one piece. In both embodiments, when the tensioning screw 18 is moved forward or rearwardly by the use of the screw adjustment knob 20, the rail block 30 is moved accordingly.

The tensioning rail attachment block 30 is held in place on the lower surface of the tensioning rail 16 by extending the rail block attachment bolt 32 upwards through the rail block 30. The attachment bolt 32 extends beyond the upper surface of the rail block 30 to where it passes when the rail block 30 is placed against the lower surface of the tensioning rail 16, into the tensioning rail attachment chamber 36. The rail attachment chamber is an opening within the tensioning rail 16 which has a narrow downward facing opening through which the attachment bolt 32 passes. The interior of the attachment chamber 36 is therefore larger than the opening for the attachment bolt 32 which creates a flat surface on either side of the passage upon which the rail block attachment nut 34 rests. Thus, when the attachment nut 34 is placed within the attachment chamber 36, the attachment bolt 32 is threaded and tightened into the attachment nut 34 which serves to hold the tensioning rail block 30 against the bottom surface of the tensioning rail 16. This construction method serves both to secure the tensioning rail 16 to the side rails 14, and to provide a means by which the tensioning rail 16 can be adjusted to vary the tension placed on the tonneau cover 12, when latched.

The tonneau cover 12 is attached to the tensioning rail 16 by use of the tonneau cover attaching rope 40. The attaching rope 40 is a length of small diameter rope that is sewn into a loop at the most forward edge of the tonneau cover 12. The attaching rope 40 and the loop are inserted into the attaching rope channel 42 located on the lower most forward surface of the tensioning rail 16. The tonneau cover 12 extends rearward from this point over the upper tensioning rail surface 38 and continues back to cover the pickup truck box 66 where it is anchored at a location above the tailgate 68. This connection allows the adjustable tensioning rail 16 to vary the position of tonneau cover 12 in order to provide a tight seal over the truck box 66.

The construction of the side rails 14 is illustrated in FIG. 5. The side rails 14 are generally L-shaped components having the short portion of the "L" forming a vertical surface extending downward from the most outside edge of the side rail 14. This vertical portion is the side rail to truck clamp surface 46 and has on its inner surface a series of ridges called clamp cleats 48. The truck clamp surface 46 provides the point of attachment for securing the side rails 14, and the present invention, to the upper and inner surface of the truck box 66. This attachment is accomplished by the use of a plurality of attachment clamps 50, which are generally C-shaped clamping devices, with one portion of the opened end of the "C" engaging the inner surface of the truck box 66 and the other engaging the clamp cleats 48 on the truck clamp surface 46 of the side rails 14. The clamp cleats 48 provide a roughened surface for the attachment clamp 50 to engage ensuring a secure attachment of the present invention and the tonneau cover 12 to the pickup truck box 66.

The longer portion of the L-shape of the side rails 14 forms the side rail component mount surfaces 44 to which the mounting apparatus for the tensioning rail 16 and the tensioning screw 18 are attached. Additionally, each of the side rails 14 also have an upwardly oriented diagonal surface 52 which serves as both the outward cosmetic edge of the side rails 14 and as guides or frames within which the tonneau cover 12 is stretched. Additionally, the tensioning rail 16 is also equipped with two tensioning rail end caps 54 which fit over each end of the tensioning rail 16 just inside of the side rail diagonal surface.

Figure 7:
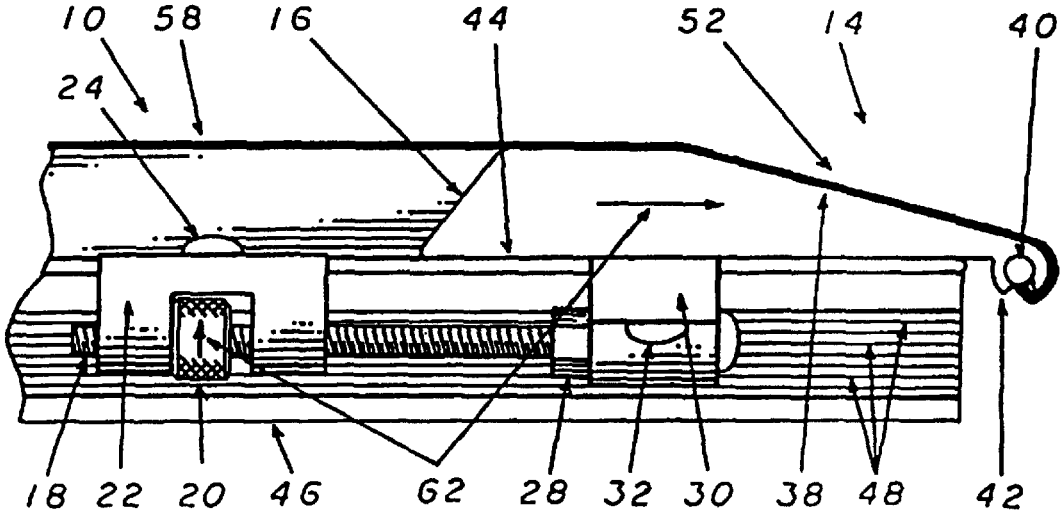
FIG. 7 is a side elevation cut-away view of the present invention showing the tensioning screw fully engaged, or with tension on the tonneau cover.

The method of operation of the tonneau cover tension adjuster apparatus 10 is further illustrated in FIGS. 6 and 7. To reduce the tension or loosen the tonneau cover 56 for either its removal or installation, the user rotates the screw adjustment knob 20 in a clockwise manner which serves to pull the tensioning rail 16 back through the tensioning screw 18 and the tensioning rail attachment block 30 (the loosening movement accomplished by this operation is illustrated by the directional arrows labeled as 60). Conversely, to obtain a tensioned or taught tonneau cover 58, when latched one simply reverses this process by rotating the screw adjustment knob 20 in a counter-clockwise manner which serves to force the tensioning rail 16 forward through the tensioning screw 18 and tensioning rail attachment block 30 (the tensioning movement accomplished by this operation is illustrated by the directional arrows labeled as 62).

Although the present invention has been described in considerable detail with reference to certain preferred versions thereof, other versions are possible. Therefore, the spirit and scope of the appended claims should not be limited to the description of the preferred versions contained herein.

What is claimed is:

1. An adjustable assembly for a cargo box cover for use on a cargo box having upwardly extending left and right side walls, [a front wall and a rear end gate wall, said walls defining the boundaries of the cargo box,] the cargo box cover having [a] left and right [rail] *side rails* connected to said left and right side wall*s, respectively*, an elongate tensioning rail having [a] left and right [end] *ends* said *elongate* tensioning rail extending from said left *side* rail to said right *side* rail, and [further having] a *flexible* cover fixedly attached [along] *to* said *elongate* tensioning rail, said adjustable assembly comprising:

*left and right adjustable threaded screw connection mechanisms, including:*

[a] *respective* left and right [block means connected] *secured portions secured* to said left and right [rail] *side rails, respectively*;

[a] *respective* left and right [attachment block means] *adjustable portions* connected to said left and right end of said tensioning rail *respectively*; [and]

[an adjustable connection means for connecting said tensioning rail to] *respective adjustable screws interconnecting the respective adjustable portions to the respective secured portions; and*

*a graduated measuring scale on the left and right side rail so as to provide a measurement guide for accurate adjustment of the respective left and right sides of the tensioning rail with respect to* said left and right *side* rail.

2. [An] *The* adjustable assembly [as in] *of* claim 1 wherein each of said left and right [block means connected to said left and right rail comprises a] *secured portions has* front and rear block [section] *sections* connected to a base block section so as to define a space between said front and rear block section, said front and rear block sections further defining a hole in an aligned orientation so as to pass through said front and rear block [section] *sections and* across [said] *the* space between [said] *the* front and rear block sections.

3. [An] *The* adjustable assembly [as in] *of* claim 2 wherein each of said left and right [attachment block means comprises] *adjustable portions include* an attachment block section having an elongate [treaded] *threaded* tension screw fixedly attached to said attachment block section and extending through said front and rear block sections spanning [said] *the* space between [said] *the* front and rear block [section] *sections*.

4. [An] *The* adjustable assembly [as in] *of* claim 3 further comprising a screw adjustment knob between said front and rear block section defining an inner threaded hole for receiving said threaded tension screw.

[5. An adjustable assembly as in claim 4 further comprising a graduated measuring scale on said left and right rail so as to accurately adjust said left and right side of said tensioning rail in respect to said left and right rail.]

6. [An] *The* adjustable assembly [as in] *of* claim [5] *4* wherein said hole defined by said front and rear block sections is of a larger diameter than said threaded tension screw.

7. [An] *The* adjustable assembly [as in] *of* claim 1 wherein said left and right [block means is] *secured portions are* fixedly connected to said left and right [end of said tensioning rail] *side rails* and said left and right [attachment block means is fixedly connected to] *adjustable portions are engaged with* said left and right *ends of said tensioning* rail.

8. An adjustable *tonneau* cover for a cargo box [that comprises] *having* upwardly extending left and right side walls, a front wall, and a rear end gate wall [said walls defining the] *that collectively define* boundaries of the cargo box, the adjustable *tonneau* cover [assembly] comprising:

*a flexible cover;*

[a] left and right [rail connected] *side rails connectable* to said left and right side wall*s, respectively*;

an elongate tensioning rail having [a] left and right [end] *ends,* said tensioning rail extending from said left *side* rail to said right *side* rail, *the flexible cover being secured to the elongate tensioning rail*; *and*

[a] left and right *adjustable threaded screw adjustment mechanisms, including:*

[block means] *left and right securing blocks* connected to said left and right [rail] *side rails, respectively*;

[a] left and right [attachment block means connected to] *adjustable engaging blocks engaged with* said left and right [end] *ends* of said tensioning rail, *respectively*; and

[an] *left and right* adjustable connection [means for] *mechanisms* connecting *the respective securing blocks to the respective adjustable engaging blocks; and*

*a graduated measuring scale on said left and right rail so as to provide a measurement guide for accurate adjustment of said left and right ends of* said tensioning rail *with respect* to [said] *the* left and right *side* rail*s, respectively*.

9. [An] *The* adjustable *tonneau* cover [for a cargo box as in] *of* claim 8 wherein each of [said] *the* left and right [block means connected to said left and right rail comprises a] *securing blocks has* front and rear block [section] *sections* connected to a base block section so as to define a space between [said] *the* front and rear block [section, said] *sections, the* front and rear block sections further defining [a hole] *openings* in an aligned orientation so as to pass through [said front and rear block section across said space between] *both of* said front and rear block sections.

10. [An] *The* adjustable *tonneau* cover [for a cargo box as in] *of* claim 9 wherein each of said left and right [attachment block means comprises] *adjustable engaging block includes* an attachment block section having an elongate [treaded] *threaded* tension screw fixedly attached to said attachment block [section] and extending through said front and rear block sections spanning [said] *the* space between [said] *the* front and rear block section*s*.

11. [An] *The* adjustable *tonneau* cover [for a cargo box as in] *of* claim 10 further comprising a screw adjustment knob between said front and rear block [section] *sections* defining an inner threaded [hole] *opening* for receiving said threaded tension screw.

[12. An adjustable cover for a cargo box as in claim 11 further comprising a graduated measuring scale on said left and right rail so as to accurately adjust said left and right side of said tensioning rail in respect to said left and right rail.]

13. [An] *The* adjustable *tonneau* cover [for a cargo box as in] *of* claim [12] *11* wherein said [hole] *openings* defined by said front and rear block sections [is] *are* of a larger diameter than said threaded tension screw.

14. [An] *The* adjustable *tonneau* cover [for a cargo box as in] *of* claim 8 wherein said left and right [block means is] *securing blocks are* fixedly connected to said left and right [end of said tensioning rail] *side rails, respectively*, and said left and right attachment [block means is] *blocks are* fixedly connected to [said left and right] *the respective ends of the tensioning* rail.

*15. An adjustable assembly for a tonneau cover used to cover a pickup truck cargo box, the cargo box having a left and right side upwardly extending walls that define an interior compartment of the cargo box, the adjustable assembly comprising:*

*left and right side rails connected to the left and right side walls, respectively;*

*an elongate tensioning rail having a tensioning rail attachment chamber and left and right ends that extend between the left side rail and the right side rail, the tensioning rail being operatively configured to attach to the tonneau cover; and*

*left and right adjustable threaded screw adjustment mechanisms, each of the respective adjustable threaded screw adjustment mechanisms having:*

*a side rail securing portion, operatively connected to respective side rails, with a threaded screw member positioned and arranged such that a force can be placed upon the tensioning rail by each of the threaded screw members as the screw member is adjustably manipulated to force the tensioning rail away from the respective side rail securing portion; and*

*a tensioning rail engagement member engaged with the tensioning rail within the tensioning rail attachment chamber.*

*16. The adjustable assembly of claim 15 wherein the tensioning rail engagement member extends below the side rail such that the tensioning rail is restrained from being lifted away from the respective side rail when the respective engagement member is engaged with the respective side rail.*

*17. The adjustable assembly of claim 15 wherein each threaded screw member is engaged in coaxially aligned openings in each of the respective side rail securing portion.*

*18. An adjustable assembly for a tonneau cover tension adjuster apparatus used to cover a pickup truck cargo box having upwardly extending left and right side walls that at least partially define an interior compartment of the cargo box, the tonneau cover tension adjuster apparatus having left and right side rails operatively configured to connect to the left and right side walls, respectively, and an elongate tensioning rail having left and right ends that extend between the left side rail and the right side rail, the adjustable assembly comprising:*

*left and right tensioning rail attachment blocks operatively configured to slidingly secure the left and right ends of the elongate tensioning rail with the respective left and right side rails; and*

*left and right tensioning screws positioned and arranged such that a force can be placed on the elongate tensioning rail by each of the tensioning screws as each tensioning screw is adjustably manipulated to move the elongate tensioning rail with respect to left and right side rails.*

*19. The adjustable assembly of claim 18 further comprising left and right side rail adjustment blocks operatively configured to attach to the left and right side rails, respectively, each tensioning screw having a first end portion attached to one of the adjustment blocks and a second end attached to one of the tensioning rail attachment blocks.*

*20. An adjustable assembly for a tonneau cover tension adjuster apparatus used to cover a pickup truck cargo box having upwardly extending left and right side walls that at least partially define an interior compartment of the cargo box, the tonneau cover tension adjuster apparatus having left and right side rails operatively configured to connect to the left and right side walls, respectively, and an elongate tensioning rail having left and right ends that extend between the left side rail and the right side rail, the adjustable assembly comprising:*

*left and right side rail adjustment blocks operatively configured to attach to the left and right side rails, respectively;*

*left and right tensioning rail attachment blocks operatively configured to attach to the left and right ends of the elongate tensioning rail, respectively; and*

*left and right tensioning screws, each tensioning screw having a first end portion attached to one of the adjustment blocks and a second end attached to one of the tensioning rail attachment blocks such that such that a force can be placed on the elongate tensioning rail by each of the tensioning screws as each tensioning screw is adjustably manipulated to move the elongate tensioning rail with respect to left and right side rails.*

*21. A tonneau cover tension adjuster apparatus used to cover a pickup truck cargo box having upwardly extending left and right side walls that at least partially define an interior compartment of the cargo box, the tonneau cover tension adjuster apparatus comprising;*

*left and right side rails operatively configured to connect to the left and right side walls, respectively;*

*an elongate tensioning rail having left and right ends that extend between the left side rail and the right side rail; and*

*an adjustable assembly comprising:*

*left and right side rail adjustment blocks attached to the left and right side rails, respectively;*

*left and right tensioning rail attachment blocks attached to the left and right ends of the elongate tensioning rail, respectively; and*

*left and right tensioning screws, each tensioning screw having a first end portion attached to one of the adjustment blocks and a second end attached to one of the tensioning rail attachment blocks such that such that a force can be placed on the elongate tensioning rail by each of the tensioning screws as each tensioning screw is adjustably manipulated to move the elongate tensioning rail with respect to left and right side rails.*

*22. A method of maintaining an appropriate tension on a tonneau cover tension adjuster apparatus secured to a cargo box of a pickup truck, the truck cargo box having upwardly extending left and right side walls that at least partially define an interior compartment of the cargo box, the method comprising steps of:*

*providing a tonneau cover tension adjuster apparatus having left and right side rails operatively configured to connect to the left and right side walls, respectively, and an elongate tensioning rail having left and right ends that extend between the left side rail and the right side rail;*

*providing an adjustable assembly having left and right tensioning screws positioned and arranged with corresponding left and right tensioning rail attachment blocks operatively configured to slidingly secure the left and right ends of the elongate tensioning rail with the respective left and right side rails; and*

*adjustably manipulating each tensioning screw to move the elongate tensioning rail with respect to left and right side rails such that a force can be placed on the elongate tensioning rail by each of the tensioning screws.*

*23. The method of claim 22 further comprising steps of:*

*attaching a tonneau cover to the left and right side rails;*

*attaching left and right side rail adjustment blocks to the left and right side rails, respectively;*

*attaching a first end portion of each tensioning screw to one of the adjustment blocks and attaching a second end of the tensioning screw to one of the tensioning rail attachment blocks; and*

*manipulating each tensioning screw to drive the tensioning rail away from the respective attachment blocks to place greater tension on the tonneau cover.*

*24. A method of maintaining an appropriate tension on a tonneau cover secured to a cargo box of a pickup truck, the truck cargo box having upwardly extending left and right side walls that at least partially define an interior compartment of the cargo box, the method comprising steps of:*

*connecting a tonneau cover tension adjuster apparatus having left and right side rails to the left and right side walls, respectively, the tonneau cover tension adjuster apparatus comprising an elongate tensioning rail having left and right ends that extend between the left side rail and the right side rail;*

*attaching a tonneau cover to the left and right side rails;*

*attaching left and right side rail adjustment blocks to the left and right side rails, respectively;*

*attaching left and right tensioning rail attachment blocks to the left and right ends of the elongate tensioning rail, respectively; and*

*attaching left and right tensioning screws to the left and right side rail adjustment blocks and left and right tensioning rail attachment blocks;*

*attaching a first end portion of first tensioning screw to the first adjustment block and attaching a second end of the first tensioning screw to the first tensioning rail attachment block;*

*attaching a first end portion of second tensioning screw to the second adjustment block and attaching a second end of the second tensioning screw to the second tensioning rail attachment block; and*

*adjustably manipulating each tensioning screw to move the elongate tensioning rail with respect to left and right side rails such that a force can be placed on the elongate tensioning rail by each of the tensioning screws.*

*25. The method of claim 24 wherein the adjustably manipulating step comprises manipulating each tensioning screw to drive the tensioning rail away from the respective attachment blocks to place greater tension on the tonneau cover.*

*26. A method of maintaining an appropriate tension on a tonneau cover secured to a cargo box of a pickup truck, the pickup truck cargo box having a plurality of upwardly extending walls, said plurality of upwardly extending walls including left and right side walls, a front wall and a rear end gate wall, said plurality of upwardly extending walls at least partially defining an interior compartment of the cargo box; the method comprising:*

*attaching a tonneau cover and a tonneau cover attachment frame having a tonneau cover adjustment mechanism to the pickup truck, the tonneau cover attachment frame including left and right side rails which are connected to said left and right side walls, respectively; an elongate tensioning rail having left and right ends, said tensioning rail extending from the left side rail to the right side rail, the tonneau cover attached to the tensioning rail; left and right side rail attachment bracket mechanisms connected to said left and right side rails, respectively; the elongate tensioning rail including left and right tensioning rail attachment members engaged with said tensioning rail and positioned and arranged to sliding secure the elongate tensioning rail to the respective side rails; wherein each of said left and right side rail attachment bracket mechanisms include a threaded screw member, and each of the threaded screw members are positioned and arranged such that a force can be placed on the elongate tensioning rail by each of the threaded screw members as each said screw member is adjustably manipulated to drive the tensioning rail away from the respective attachment bracket mechanism, thereby placing greater tension on the tonneau cover; and*

*manipulating the respective attachment bracket mechanisms so as to drive the tensioning rail away from the respective attachment bracket mechanism, thereby placing greater tension on the tonneau cover following the step of attaching, at such time as it is desireable to place a greater tension on the tonneau cover.*

* * * * *